Patented Apr. 25, 1944

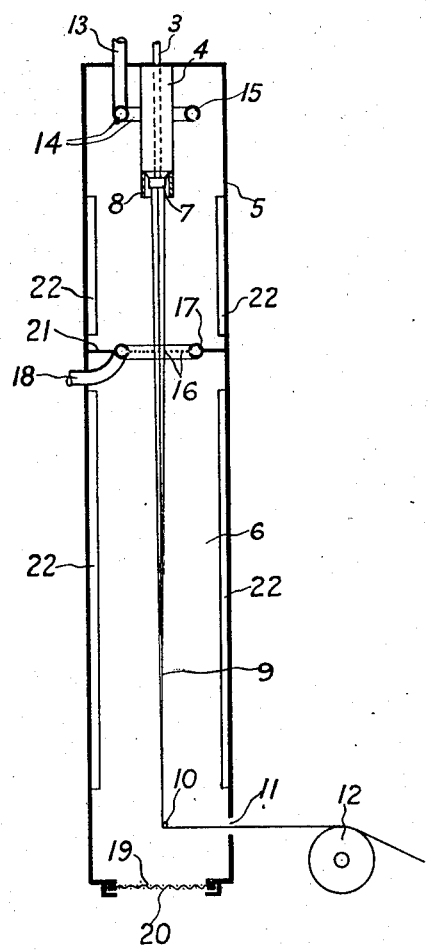

2,347,545

UNITED STATES PATENT OFFICE 2,347,545

PRODUCTION OF ARTIFICIAL FILAMENTS, FILMS, AND OTHER ARTICLES FROM ORGANIC POLYMERIZATION PRODUCTS

Henry Dreyfus, London, and Robert Wighton Moncrieff and Charles William Sammons, Spondon, near Derby, England, assignors to Celanese Corporation of America, a corporation of Delaware Application July 11, 1941, Serial No. 401,992
In Great Britain May 31, 1940

1 Claim. (Cl. 260—78)

This invention relates to the production of artificial filaments, films and other articles from organic polymerization products, and more particularly to textile materials and the like having a basis of synthetic film- or fibre-forming substances.

There have recently been developed a number of synthetic film- or fibre-forming substances produced by the union of the residues of the molecules of one or more reagents, each containing two reactive groups in the molecule, by condensation of a reactive group of one molecule with a reactive group of another molecule, water, hydrochloric acid or a similar substance being eliminated during the reaction. A particularly useful class of substances or polymers of this nature, especially for the production of textile materials, may be formed, for example, by condensing diamines with dicarboxylic acids, with dihalides of dicarboxylic acids, or with diesters of dicarboxylic acids, or with disulphonic acids or their derivatives, or by condensing aminocarboxylic acids or aminosulphonic acids with themselves or with each other. By a suitable choice of reagents it is possible to produce substances with long chain molecules of high molecular weight which can be converted into fibres or films. Preferably reagents are chosen which have no substantial tendency to condense with formation of cyclic compounds. This may be achieved by selecting the reagents in such a way that the "unit length" of the resulting polymer consists of more than 6 atoms in a chain, and preferably more than 7 atoms. In the case of condensing diamines with dicarboxylic acids, for example, the unit length is arrived at by adding the number of atoms joining the two nitrogen atoms in the diamines plus 2, to the number of atoms joining the carboxylic groups in the dicarboxylic acids plus 2.

The synthetic polymers produced by such reactions as described above may be converted into shaped articles, for example filaments, foils, ribbons or moulded articles, in various ways. For example, the polymers may be fused in the pure condition and extruded into filamentary products, being set by the action of a cooling medium which may be a liquid, gas or vapour. Such a process is described, for example in U. S. application S. No. 333,952, filed May 8, 1940, now Patent No. 2,303,340. The polymers, however, melt in general at temperatures of the order of 200–300° C., and at temperatures above or in the neighbourhood of the melting point are found to be somewhat unstable, even when they have been formed in the presence of so-called stabilizing agents, e. g. in the presence of a slight excess of one of the component reagents. Thus, one of the results of maintaining a polymer at a temperature slightly above its normal melting point is to degrade it so that its viscosity is substantially lowered. In consequence, shaped articles formed therefrom do not possess the tenacity or hardness usually desired in such products. With a view to overcoming this tendency to degradation at temperatures above the melting point of the polymer, it has been proposed to incorporate plasticisers in the materials, and a particularly satisfactory method of shaping poly-sulphonamides and like polymers in the fused condition has been found to comprise incorporating a proportion of a low-melting or liquid sulphonamide in the materials, and fusing and shaping the resulting composition; this method is described in greater detail in U. S. application S. No. 382,774, filed March 11, 1941.

Synthetic polymers of the type described above may be dissolved in phenols or in aliphatic carboxylic acids to concentrations of the order of 40–45% and it has been suggested that the resulting solutions may be spun into filaments by dry or wet methods. In the case of employing phenol solutions of the polyamides, difficulties may arise as a result of the tendency of phenols themselves to become discoloured in the presence of other materials, particularly oxygenated materials, e. g. air. Of the aliphatic acids, formic appears to be by far the best, since polyamides are more easily dissolved therein than in the other aliphatic acids, and since formic acid itself is more readily removed from shaped articles than are the others. With formic acid, however, though the polyamide dissolves quite rapidly in the acid, it has hitherto been supposed that it only dissolved to an extent of about 50 parts of polyamide for each 50 parts of acid; a solution of this composition is only semi-solid at temperatures of the order of 25–30° C. The result of this has been that, in forming shaped articles, it has been necessary to remove a high proportion of formic acid shortly after the products have been shaped, which is undesirable, particularly in the case of forming artificial filaments, since it involves rather drastic treatment of the materials while in their most delicate condition.

We have now made the surprising discovery that the continued removal of formic acid from polyamide/formic acid solutions beyond the concentration corresponding to apparent saturation results in the separation of a solid material which has been found to consist, not of pure polyamide, but of a complex of formic acid and the polyamide. This complex, which is a solid solution at ordinary temperatures, melts at a temperature substantially below the melting point of the pure polyamide. Thus, in the case of the polymer formed by condensing hexamethylene diamine and adipic acid, there is separated a solid which consists of approximately 72% of the polyamide and 28% of formic acid and which is found to melt at a temperature of the order of 40° C. below the melting point of the pure polyamide and can therefore be extruded or otherwise shaped or moulded in the molten condition at temperatures substantially below that point.

In producing a composition to be shaped, a polyamide may be agitated with an amount of formic acid sufficient to dissolve it to form, for example, a 30-40% solution of polyamide, which will in general be found to be a viscous liquid at ordinary temperatures. On raising the temperature of this solution to about 70-100° C., formic acid may be vaporised and condensed outside the heating chamber so that the solution becomes more concentrated. Evaporation may be accelerated by working under reduced pressure, if desired. Advantageously, the temperature of evaporation is maintained at not substantially above 75° C., so that substantially all tendency for the polyamide to become degraded is eliminated. When the concentration reaches a certain point, which depends upon the temperature of evaporation, solid composition commences to separate from the liquid, and heating may be continued until substantially the whole mass becomes solid within the temperature range specified. Further heat may then be applied to fuse the composition, which may be directly shaped or may be run into another vessel, such as described, for example, in U. S. application S. No. 333,952, filed May 8, 1940 now Patent No. 2,303,340, for subsequent extrusion or other shaping operation.

In the production of artificial filaments from the high concentration compositions according to the invention, extrusion may take place under pressure of any appropriate inert liquid, vapour or gas. The extruded materials may be received in an inert atmosphere contained in an enclosed chamber supplied with a draw-off intermediate between the extrusion orifice and the outlet for the extruded materials, as described in U. S. application S. No. 382,007, filed April 17, 1941, now Patent No. 2,335,922. In such a way, the extruded materials may be sufficiently cooled before coming into contact with air that there is no tendency to discolour due to contact with oxygen. On the other hand, the extruded materials may be received, preferably after a short passage through a hot gaseous medium, in a liquid setting medium, which may be water, an aqueous solution, for example, of a caustic alkali or of sodium formate, or an organic medium, e. g. a ketone such as, for example, acetone. The extruded materials are preferably wound up at a rate somewhat in excess of that at which they are extruded from the fusion chamber so that draw-down is applied to them during their travel. After setting, the materials may be drawn down to a substantial extent, preferably in the presence of water, steam or other hydroxyl-containing compound, and the elasticity of the products after such a drawing treatment is surprisingly high.

The accompanying drawing shows, by way of example, apparatus which may be employed in spinning from a mass of molten composition in accordance with the present invention.

A narrow tube 3 surrounded by an electric heating element 4 is mounted in the upper end of a cylindrical casing 5 enclosing a chamber 6, and feeds molten material to a spinning jet 7 which is closely surrounded by an electric heating element 8 to maintain the face of the jet and the closely adjacent atmosphere at a desired elevated temperature. Filaments 9, extruded from the jet 7, pass down the chamber 6 to a guide bar 10 and thence through a small opening 11 to a feed roller 12 and a suitable winding, twisting and winding, or other take-up device, not shown. The upper part of the chamber 6 is fed with an inert gas or vapor from a lead 13, through holes 14 in an annular pipe 15. This inert gas or vapor is drawn off from the chamber through holes 16 in an annular pipe 17, to a suction pipe 18. The annular pipe 17 is situated at such a distance from the jet 7 that the filaments 9 before they reach the level of the pipe have cooled sufficiently to be substantially undamaged by contact with air. The suction applied through the holes 16 also draws air into the lower part of the chamber 6, through the circular hole 19 covered with fine wire gauze 20 in the base of the casing 5. A small amount of air also enters through the opening 11. A diaphragm 21, mounted between the annular pipe 17 and the casing 5, prevents the passage of gases or vapors through this space, and electric heating elements 22 on the inside of the casing 5 can be employed for heating the atmosphere in the chamber 6.

Depending upon the method employed for setting the materials, there may still remain in the filaments or other products after winding up and/or drawing, a substantial proportion of formic acid. They may, therefore, be subjected to any appropriate washing treatment to remove this acid. For example, they may be immersed in a bath of a medium such as the liquid setting media described above, or sprayed or otherwise irrigated therewith.

Besides the formic acid, other agents may also be employed for the purpose of facilitating the dissolution of the polyamide, for reducing the melting point of the concentrated composition, and/or for increasing the plasticity of the shaped and set materials. For example, other solvents, e. g. trichloracetic acid, phenol, and resorcinol, may be present, or a low-melting sulphonamide may be incorporated in the original solution prior to concentration, whereby a lower-melting composition may be produced and products of greater plasticity formed. If it is not desired to retain the sulphonamide in the products, it may be washed out in a manner similar to that employed for removing residual formic acid, due regard being paid to the solubility of the various components. Again, effect materials may be incorporated in the compositions at any suitable stage, e. g. by introduction during production of the polyamide or into the relatively dilute solution. Such materials may be, for example, delustring agents, e. g. titanium dioxide, pigments or dyestuffs.

Reference has been made above more particularly to the polyamides produced by condensing diamines with diacids or their derivatives, or by condensing aminoacids with themselves. While the invention is of the greatest importance in connection with such polymers, other synthetic film- or fibre-forming polymers may be employed according to the invention, either alone or in association with polyamides. For example, polymers formed by condensing dihalides with diamines or with glycols may be employed.

Shaped materials according to the invention may have the form of filaments, yarns, films, foils or other shaped articles formed by extrusion or like methods, or may be in the form of plastic masses formed by moulding, e. g. by injection moulding, the fused compositions. Filamentary products may be converted, if desired, into staple fibre, e. g. by cutting methods. The filamentary materials and/or staple fibres may be converted into yarns suitable for use in the production of textile fabrics, and films, foils and the like may be employed for wrapping purposes, for inter-layers in splinterless glass manufacture, and for other purposes to which thermoplastic films and the like have previously been applied.

The following example illustrates the invention:

*Example*

A mixture of 100 parts by weight of hexamethylene diammonium adipate, 100 parts by weight of phenol, and 1.1 parts by weight of adipic acid is heated at 190° C. for six hours under an atmosphere of nitrogen to form a high viscosity polymer. The resulting mixture, after cooling, is dissolved in cold 85% formic acid and the solution poured into a large excess of water to precipitate the polymer as a white fibrous mass. The product is purified by thoroughly washing first with hot water and then with hot acetone.

20 parts by weight of the purified polymer are dissolved in 80 parts by weight of 98/100 formic acid in the cold to yield a clear viscous liquid at 30° C. The solution so formed is heated in an atmosphere of nitrogen at 75° C. to evaporate formic acid. When the solution reaches a concentration of about 54% polymer, a solid having the composition 72.4% polymer/27.6% formic acid begins to separate. Evaporation is continued until substantially all the mass is solid, and the solid material is then separated from residual liquid.

A quantity of the precipitated solid solution is fused under nitrogen in a stainless steel vessel and passed through a heated narrow tube as described in U. S. application S. No. 375,762, filed January 24, 1941, to a jet having ten orifices each of diameter 0.2 mm. The conditions are adjusted so that the solution at the time when it reaches the jet has a temperature of substantially 255° C. and the jet face is maintained at the same temperature by means of an electric heating coil closely surrounding it. Under pressure of nitrogen the solution is extruded according to U. S. application S. No. 382,007, now Patent No. 2,335,922, into a chamber, the upper part of which is filled with nitrogen. After setting, the resulting filament bundle is freed from formic acid by washing in dilute aqueous caustic alkali and in water, and during one or more of the washing treatments the bundle is subjected to a stretching operation.

Having described our invention, what we desire to secure by Letters Patent is:

A composition for use in the production of artificial filaments, yarns, films and other shaped or molded articles by shaping or molding the same in a fused condition, which consists of approximately 72% of a filament- or film-forming polyamide formed by condensing hexamethylene diamine with adipic acid and 28% of formic acid, said composition being solid at ordinary temperature and melting at a temperature below the melting point of said polyamide.

HENRY DREYFUS.
ROBERT WIGHTON MONCRIEFF.
CHARLES WILLIAM SAMMONS.